United States Patent
Kobayashi

(10) Patent No.: US 9,610,499 B2
(45) Date of Patent: Apr. 4, 2017

(54) GAME CONTROL SERVER APPARATUS

(71) Applicant: DeNA Co., Ltd., Tokyo (JP)

(72) Inventor: Kenji Kobayashi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 254 days.

(21) Appl. No.: 14/547,313

(22) Filed: Nov. 19, 2014

(65) Prior Publication Data

US 2015/0148126 A1    May 28, 2015

(30) Foreign Application Priority Data

Nov. 27, 2013  (JP) .................................. 2013-245371

(51) Int. Cl.
*G06F 17/00*  (2006.01)
*A63F 13/58*  (2014.01)
*A63F 13/75*  (2014.01)
*A63F 13/35*  (2014.01)

(52) U.S. Cl.
CPC .............. *A63F 13/58* (2014.09); *A63F 13/75* (2014.09); *A63F 13/35* (2014.09)

(58) Field of Classification Search
USPC .................................................... 463/30–33
See application file for complete search history.

(56) References Cited

U.S. PATENT DOCUMENTS 8,585,508 B1 *  11/2013  Takagi ..................... A63F 13/10
                                                     463/29
8,690,654 B2 *   4/2014  Okamura ................ A63F 13/10
                                                     463/1
8,827,788 B2 *   9/2014  Takagi ..................... A63F 13/35
                                                     463/1
2012/0309504 A1  12/2012  Isozaki
2013/0260881 A1  10/2013  Nonaka et al.
(Continued)

FOREIGN PATENT DOCUMENTS

| JP | 5086487 | 11/2012 |
| JP | 2012-249714 | 12/2012 |
| JP | 2013-188268 | 9/2013 |

OTHER PUBLICATIONS

Japanese Office Action mailed Apr. 30, 2014.
(Continued)

*Primary Examiner* — Ronald Laneau
(74) *Attorney, Agent, or Firm* — IPUSA, PLLC

(57) ABSTRACT

A game control server apparatus includes an enhancement screen display processing unit that displays an enhancement screen for enhancing a game medium that appears in a game and that is provided with a predetermined parameter value, the enhancement screen including a predetermined number "N" ("N" is an integer that is two or more) of selection areas and an enhancement management unit that accepts a selection of a predetermined number n (n is an integer, where n<N) of the selection areas among the selection areas of the enhancement screen, wherein the predetermined number "N" of the selection areas include a selection area associated with a parameter data component for varying a parameter value of the game medium and there is further a case that the predetermined number "N" of the selection areas include a selection area associated with a stopper for terminating the selection of the selection areas.

6 Claims, 15 Drawing Sheets

(56) References Cited

U.S. PATENT DOCUMENTS

| | | | | |
|---|---|---|---|---|
| 2013/0288762 A1* | 10/2013 | Yoshie | ............... | G06F 17/30 463/8 |
| 2014/0121012 A1* | 5/2014 | Tagawa | ............... | A63F 13/06 463/31 |
| 2015/0157937 A1* | 6/2015 | Yoda | ............... | A63F 13/35 463/42 |

OTHER PUBLICATIONS

Official Perfect Guide of Pawapurokun Pocket 13, Enterbrain Co., Ltd., Feb. 17, 2011, first edition, pp. 334-335, 342-344, 432-434, with English concise explanation.

\* cited by examiner

FIG.5

| GAME MEDIUM ID | ICON DATA | GAME MEDIUM NAME | PARAMETER DATA FOR ENHANCEMENT |
|---|---|---|---|
| M001 | image_M001 | Sword | ATK: +20, ATK: +10, ATK: +5, ..., "ARMOR" |
| M002 | image_M002 | Magical pen | DEF: +20, DEF: +10, DEF: +5, ... |
| M003 | image_M003 | ... | ... |
| M004 | image_M004 | ... | ... |
| ... | ... | ... | ... |

| PLAYER ID | STATUS | ICON DATA | PLAYER NAME | CURRENCY IN GAME | NUMBER OF ENHANCEMENT RIGHTS | POSSESSING GAME MEDIUM ||| ... |
|---|---|---|---|---|---|---|---|---|---|
| | | | | | | GAME MEDIUM ID | PARAMETER | ENHANCEMENT STATUS | |
| p001 | 16 | image_p001 | AAA | xx Gold | 5 | M001 | ATK: +10, DEF: +5, ... | NOT YET | ... |
| | | | | | | M002 | ... | ALREADY ENHANCED | ... |
| | | | | | | M004 | ... | NOT YET | ... |
| | | | | | | .. | .. | .. | .. |
| p002 | 1 | image_p002 | BBB | xx Gold | 2 | M001 | ... | ALREADY ENHANCED | ... |
| .. | .. | .. | .. | .. | .. | .. | .. | .. | .. |

| GAME MEDIUM ID | ICON DATA | GAME MEDIUM NAME | NUMBER OF POSSIBLE ENHANCEMENTS | PARAMETER DATA FOR ENHANCEMENT |
|---|---|---|---|---|
| M001 | image_M001 | Sword | 5 | ATK: +20, ATK: +10, ATK: +5, ⋯, "ARMOR" |
| M002 | image_M002 | Magical pen | 2 | DEF: +20, DEF: +10, DEF: +5, ⋯ |
| M003 | image_M003 | ⋮ | 2 | ⋮ |
| M004 | image_M004 | ⋮ | 2 | ⋮ |
| ⋯ | ⋯ | ⋯ | ⋯ | ⋯ |

| GAME MEDIUM ID | ICON DATA | GAME MEDIUM NAME | NUMBER OF POSSIBLE ENHANCEMENTS | | PARAMETER DATA FOR ENHANCEMENT |
|---|---|---|---|---|---|
| | | | PARAMETER RANGE | TIMES | |
| M001 | image_M001 | Sword | ATK: +20 OR MORE | 5 | ATK: +20, ATK: +10, |
| | | | ATK: LESS THAN +20 | 2 | ATK: +5, ···, "ARMOR" |
| M002 | image_M002 | Magical pen | ATK: +20 OR MORE | 5 | DEF: +20, DEF: +10, DEF: +5, |
| | | | ATK: LESS THAN +20 | 2 | ··· |
| ·· | ·· | ·· | ·· | ·· | ·· |

64

GAME CONTROL SERVER APPARATUS

CROSS-REFERENCE TO RELATED APPLICATION

The present application is based on and claims the benefit of priority of Japanese Priority Application No. 2013-245371 filed on Nov. 27, 2013, the entire contents of which are hereby incorporated by reference.

BACKGROUND OF THE INVENTION

1. Field of the Invention

The present invention relates to a game control server apparatus.

2. Description of the Related Art

Conventionally, a game has been provided in which a level of a game medium such as a player character or the like is raised so that an ability value (parameter) of the game medium is increased in accordance with an action by a player in the game. For example, Patent Document 1 discloses a technique by which, by combining game cards (synthesizing the game cards), a parameter of a character corresponding to the synthesized game card is varied.

However, in the above described conventional game, there is no dramatic surprise and the player does not have an opportunity to participate in how to vary the ability value of the game medium, when raising the level of the game medium (in enhancing the game medium).

PATENT DOCUMENT

[Patent Document 1] Japanese Patent No. 5,086,487

SUMMARY OF THE INVENTION

The present invention is made in light of the above problems, and provides a technique by which a player can participate in when enhancing a game medium in a game.

According to an embodiment, there is provided a game control server apparatus that is connected to a terminal device of a player via a network, including an enhancement screen display processing unit that displays an enhancement screen for enhancing a game medium that appears in a game and that is provided with a predetermined parameter value, on the terminal device of the player, the enhancement screen including a predetermined number "N" ("N" is an integer that is two or more) of selection areas; an enhancement management unit that accepts a selection of a predetermined number n (n is an integer, where n<N) of the selection areas among the predetermined number "N" of the selection areas of the enhancement screen, from the terminal device of the player; a game management control unit that gives a parameter value to the game medium in accordance with an action of the player in the game; and a game medium information storing unit that stores an upper limit of a number of times capable of displaying the enhancement screen in association with the game medium and a range of the parameter value of the game medium, the higher the parameter value of the game medium is, the larger the upper limit is set for the same game medium. The predetermined number "N" of the selection areas include a selection area associated with a parameter data component for varying a parameter value of the game medium and there is further a case that the predetermined number "N" of the selection areas include a selection area associated with a stopper for terminating the selection of the selection areas. The enhancement management unit is configured to accept the selection of the selection areas until the number of the selected selection areas becomes a predetermined number "n" among the predetermined number "N" of the selection areas while varying the parameter value of the game medium, when the selection area associated with the parameter data component is selected, in accordance with the parameter data component, performing a termination process by which the selection of the selection areas in the enhancement screen is terminated, when the selection area associated with the stopper is selected, and canceling the selection of the selection area associated with the stopper under a condition that the player pays a predetermined counter value. In enhancing the game medium, the enhancement management unit accepts a designation of the number of times "M" for displaying the enhancement screen from the terminal device of the player, determines whether the designated number of times "M" is less than or equal to the upper limit of the number of times capable of displaying the enhancement screen that is associated with the range of the parameter value in which the predetermined parameter value is included based on the predetermined parameter value of the game medium of the player, and controls the enhancement screen display processing unit to display the enhancement screen for "M" times when the number of times "M" is less than or equal to the upper limit.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of an internal structure of a game medium information storing unit of the embodiment;

FIG. 6 is a view illustrating an example of an internal structure of a player information storing unit of the embodiment;

FIG. 14 is a view illustrating another example of the internal structure of the game medium information storing unit of the embodiment; and FIG. 15 is a view illustrating another example of the internal structure of the game medium information storing unit of the embodiment.

DETAILED DESCRIPTION OF THE PREFERRED EMBODIMENTS

Figure 1:
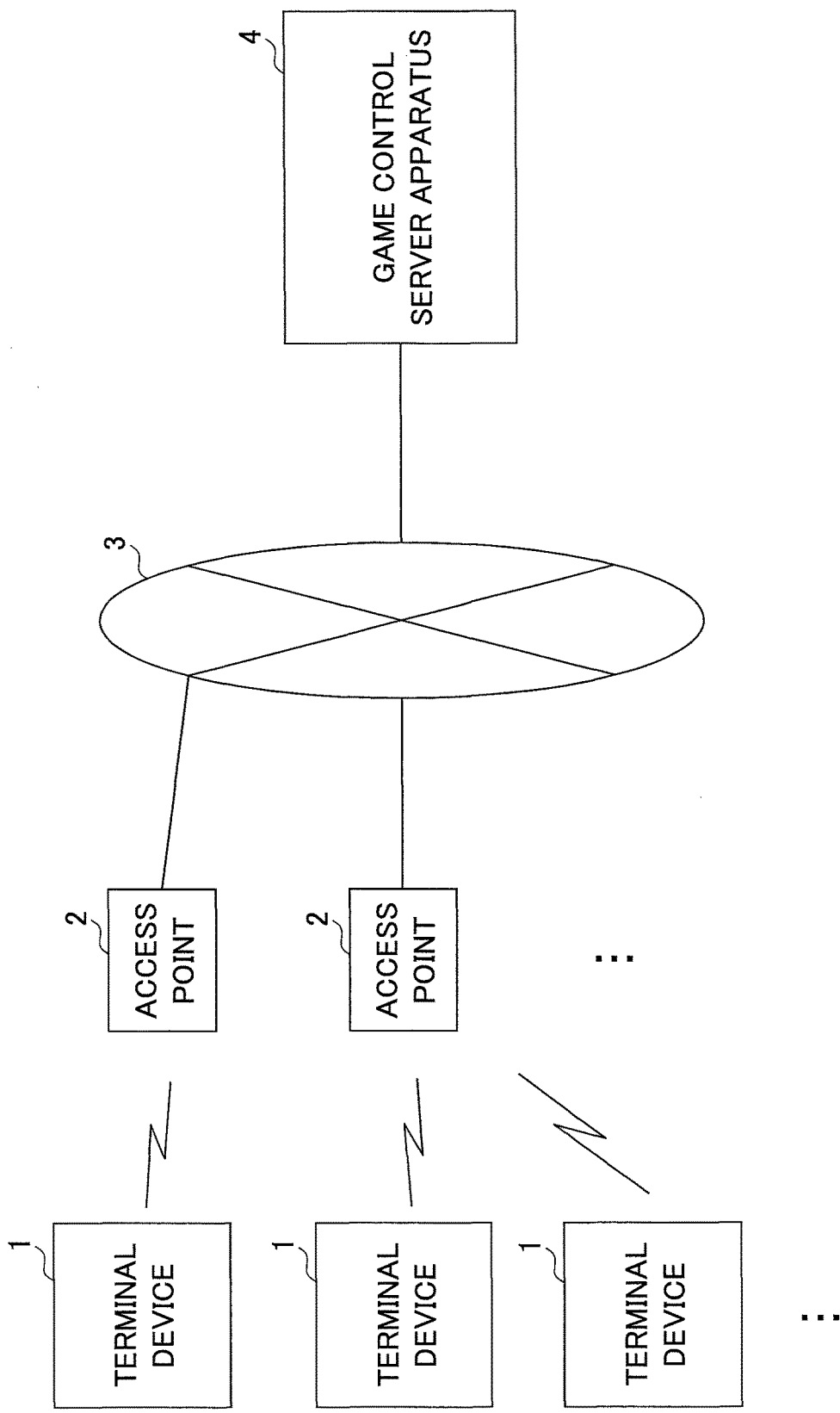
FIG. 1 is a block diagram illustrating an example of a system structure of the embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a block diagram illustrating an example of a system structure of the embodiment.

The system includes a plurality of terminal devices 1 each possessed by a player (user), access points 2 such as a mobile station, a Wi-Fi station or the like, a network 3 such as INTERNET or the like and a game control server apparatus 4 that manages (controls) a game played by the plurality of players via the network 3. The game control server apparatus 4 is connected to the terminal devices 1 of the plurality of players via the network 3. The terminal device 1 may be a data processing apparatus such as a mobile phone, a smartphone, a game console, a personal computer, a touch pad, a digital book reader or the like.

Figure 2:
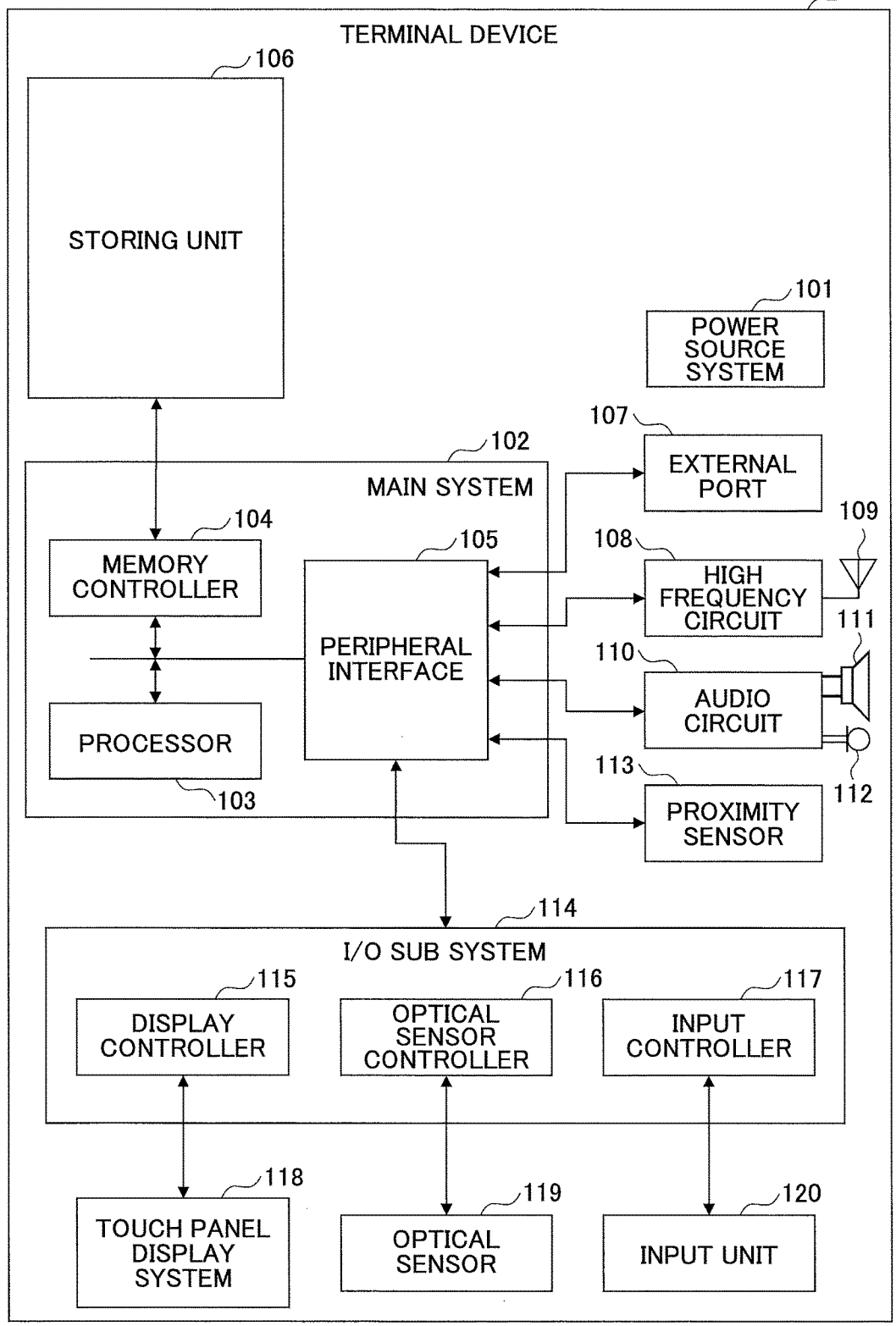
FIG. 2 is a block diagram illustrating an example of a hardware structure of a terminal device of the embodiment.

FIG. 2 is a block diagram illustrating an example of a hardware structure of the terminal device 1 of the embodiment.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O (Input/Output) sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
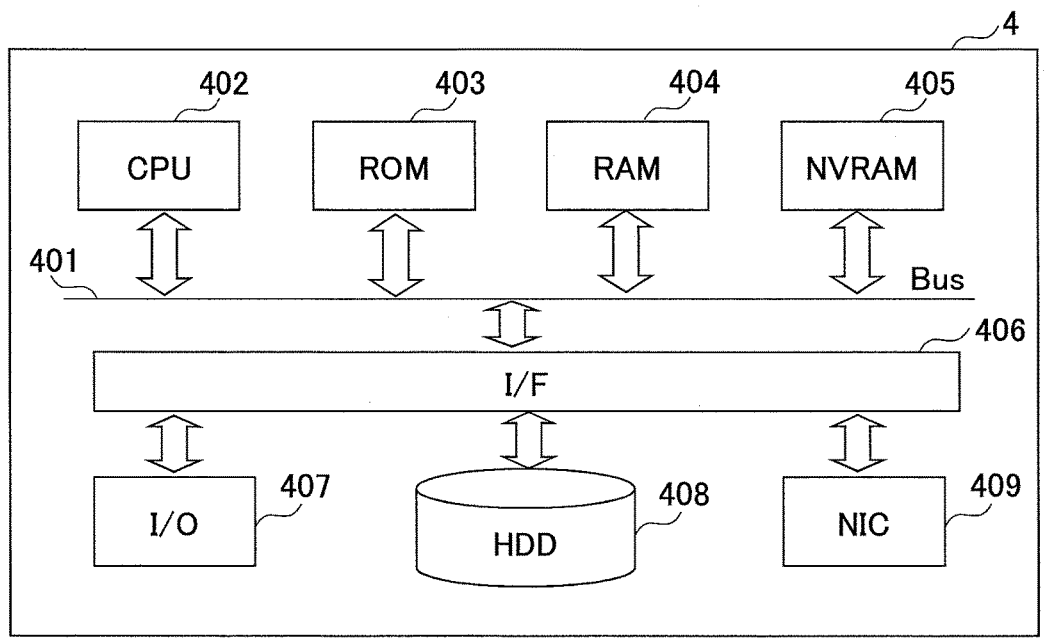
FIG. 3 is a block diagram illustrating an example of a hardware structure of a game control server apparatus of the embodiment.

FIG. 3 is a block diagram illustrating an example of a hardware structure of the game control server apparatus 4 of the embodiment.

The game control server apparatus 4 includes a CPU (Central Processing Unit) 402, a ROM (Read Only Memory) 403, a RAM (Random Access Memory) 404, an NVRAM (Non-Volatile Random Access Memory) 405 and an I/F (Interface) 406 connected to a system bus 401, an I/O (Input/Output Device) 407 for a keyboard, a mouse, a monitor, a CD/DVD (Compact Disk/Digital Versatile Disk) drive or the like, an HDD (Hard Disk Drive) 408 and an NIC (Network Interface Card) 409 connected to the I/F 406 and the like.

Figure 4:
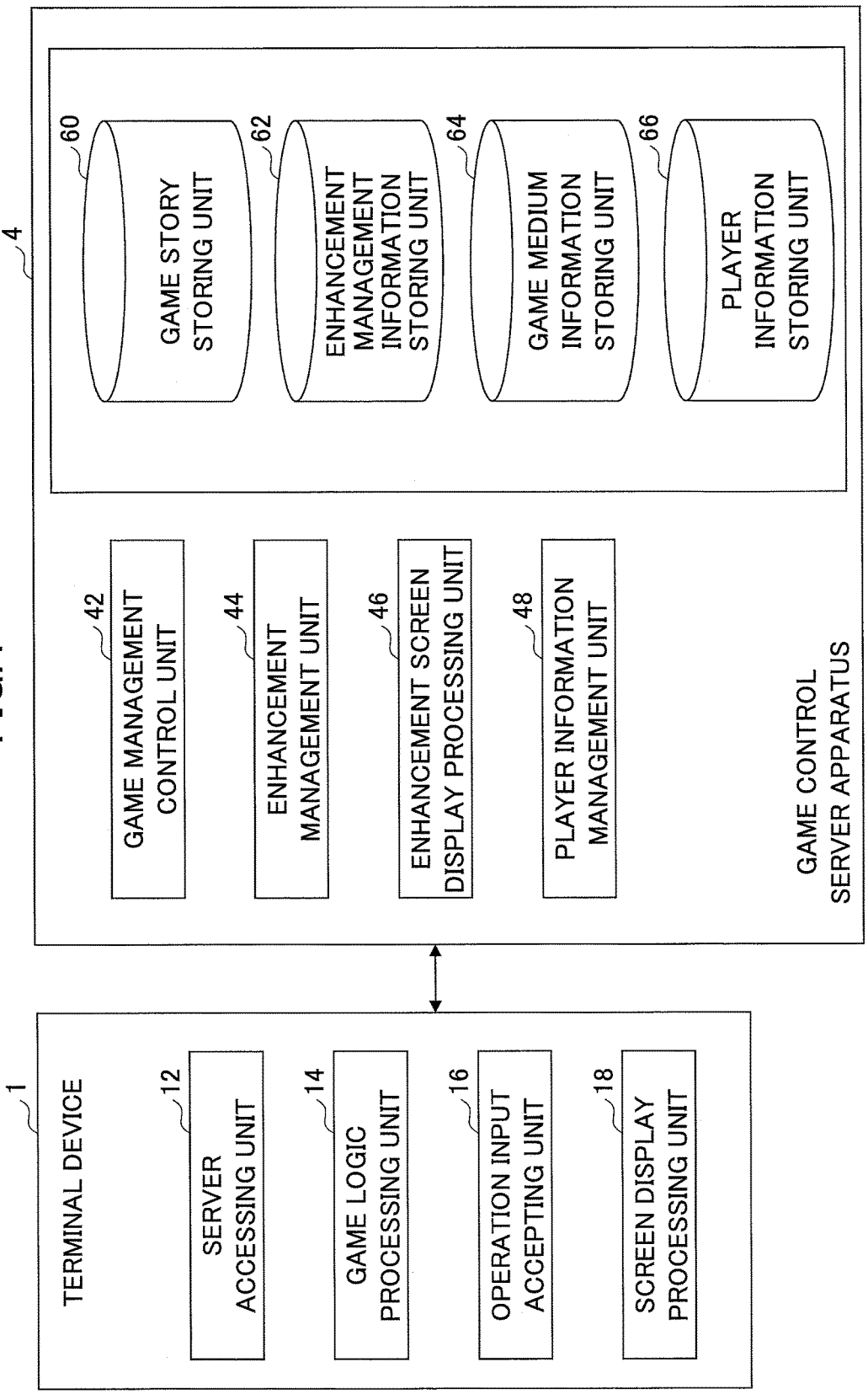
FIG. 4 is a block diagram illustrating an example of functional structures of the terminal device and the game control server apparatus of the embodiment.

FIG. 4 is a block diagram illustrating an example of functional structures of the terminal device 1 and the game control server apparatus 4.

The terminal device 1 includes a server accessing unit 12, a game logic processing unit 14, an operation input accepting unit 16 and a screen display processing unit 18.

The operation input accepting unit 16 accepts an operation input from a player (user) who operates the terminal device 1.

The game logic processing unit 14 process a game by transitioning screens in accordance with an input operation of the player accepted by the operation input accepting unit 16.

The server accessing unit 12 sends a request to the game control server apparatus 4 and receives a processed result or the like as a response from the game control server apparatus 4 when it is necessary to access the game control server apparatus 4 in a course of the processing by the game logic processing unit 14.

The screen display processing unit 18 displays screens under control of the game logic processing unit 14.

The game control server apparatus 4 includes a game management control unit 42, an enhancement management unit 44, an enhancement screen display processing unit 46, a player information management unit 48, a game story storing unit 60, an enhancement management information storing unit 62, a game medium information storing unit 64 and a player information storing unit 66.

The game story storing unit 60 stores a game story or the like for performing the game of the embodiment.

The game management control unit 42 controls the entirety of the game control server apparatus 4. The game management control unit 42, based on a request from the terminal device 1, processes a process along with the game story by referring to the game story storing unit 60, and sends a processed result of the request to the terminal device 1 as a response, for example.

In the game targeted in this embodiment, for example, when each of the players operates its own character such as a player character or the like to perform an action such as questing, attacking, defeating a boss character or the like in a game space, the player may obtain points. Then, the status of the player or the ability (parameter value) of the player character may be increased in accordance with the obtained points.

Further, the character may use equipment such as a weapon, a guard or the like when the character performs the action in the game space. The equipment may be provided with a parameter value and may show a power in accordance with its parameter value. For example, when a player who possesses equipment performs an action to the equipment in the game, a parameter value of the equipment may be increased. The game management control unit 42 provides and manages those points and parameter values.

Hereinafter, a component that appears in the game and that is provided with a predetermined parameter value, for example, such as a character such as a player character, equipment used by the character such as a weapon, a guard or the like, a game card or the like is referred to as a "game medium".

In the game as configured as such, a player may enhance a game medium at predetermined timing. The enhancement management unit 44 controls an enhancement process for enhancing the game medium. Specifically, in this embodiment, an enhancement screen including a predetermined number "N" ("N" is an integer that is two or more) of selection areas is used. The enhancement management unit 44 performs a process of associating a parameter data component for varying a parameter value of an enhancement target game medium, to each of the selection areas of the enhancement screen.

Further, in this embodiment, the enhancement management unit 44 may not necessarily associate the parameter data components to all of the selection areas and may associate a "stopper" to a part of the selection areas. It is assumed that when the selection area associated with the "stopper" is selected, the selection of the selection area in the current enhancement screen is terminated. The enhancement management information storing unit 62 stores information which is referred to by the enhancement management unit 44 when performing the enhancement process such as to what ratio the "stopper" is to be included or the like.

The timing to enhance the game medium may be arbitrary timing desired by a player, or alternatively, timing set by a system side such as when a predetermined condition is satisfied or the like. Further, the number of times capable of enhancing each of the game media may be limited. For example, it may be set that each of the game media can be enhanced only once or the like. In such a case, for the game medium that is enhanced once may be displayed as "already enhanced" and such a game medium may be made impossible to be enhanced thereafter. As an example, the game medium that becomes an enhancement target may be a game medium obtained by a player in the game space while playing the game that cannot be purchased in a shop or the like.

The game medium information storing unit 64 stores various game medium information of all of the game media that appear in the game. The enhancement management unit 44 also manages updating, referring or the like of the game medium information stored in the game medium information storing unit 64.

FIG. 5 is a view illustrating an example of an internal structure of the game medium information storing unit 64 of the embodiment.

The game medium information storing unit 64 includes items (fields) such as "game medium ID", "icon data", "game medium name", "parameter data for enhancement", or the like.

The "game medium ID" is data to specify the game medium. The "icon data" is data to specify a display icon of the game medium. The "game medium name" is data for display name of the game medium.

The "parameter data for enhancement" is data indicating candidates of a parameter data component when varying a parameter value of the game medium by the enhancement. A plurality of candidates of the parameter data component may be associated with each of the game media. The parameter data component has a structure in which a kind of parameter that is varied (increased or decreased) when enhancing the game medium and a variation value are associated with each other.

For example, "ATK: +20", "ATK: +10", "ATK: +5" and the like are associated with the game medium whose game medium ID is "M001" as the candidates of the parameter data component. Here, "ATK" indicates offensive power (kind of parameter) and "+20" or the like indicates a variation value.

Further, as the candidates of the parameter data component, a special ability may be included. For example, a special ability "ARMOR" is associated with the game medium whose game medium ID is "M001".

Referring back to FIG. 4, the enhancement management unit 44 controls, by referring to the enhancement management information storing unit 62, to what ratio the "stopper" is to be included. In addition, the enhancement management unit 44 controls, by referring to the "parameter data for enhancement" of the game medium information storing unit 64, which of the parameter data components is to be associated with each of the selection areas, or the like.

For example, the enhancement management unit 44 may randomly select one from the plurality of candidates of the parameter data component associated with the respective game medium for associating with each of the selection areas. Further, although not illustrated in FIG. 5, the plurality of candidates of the parameter data component associated with each of the game media may be further associated with weighting coefficients, respectively. The enhancement management unit 44 may randomly select one from the plurality of candidates of the parameter data component associated with the respective game medium for associating with each of the selection areas in consideration of the weighting coefficients.

Under the control of the enhancement management unit 44, the enhancement screen display processing unit 46 displays an enhancement screen for enhancing a game medium. Specifically, as described above, the enhancement screen including the predetermined number "N" ("N" is an integer that is two or more) of selection areas is used. Then, the enhancement screen display processing unit 46 displays the enhancement screen on the terminal device 1 of a player under a state that the parameter data component associated with each of the selection areas is not known (not displayed) to the player. The parameter data component associated with each of the selection areas may be displayed (revealed) to the player after the player selects the selection area.

The enhancement management unit 44 accepts a selection of "n" selection areas among the "N" selection areas of the enhancement screen from the terminal device 1 of the player ("n" and "N" are predetermined integers, respectively, where n<N). Thereafter, the enhancement management unit 44 varies the parameter value of the game medium in accordance with the parameter data component associated with the selection area selected by the player. Further, when the selection area associated with a special ability is selected, the enhancement management unit 44 gives the special ability to the respective game medium.

When the selection area associated with the "stopper" is selected, the enhancement management unit 44 performs a termination process of terminating the selection of the selection areas for the current enhancement screen. Here, it is assumed that a player cannot select selection areas of the current enhancement screen anymore when the selection area associated with the "stopper" is selected.

Further, in this embodiment, even if the selection area associated with the "stopper" is selected, if the player pays a predetermined counter value, the enhancement management unit 44 may cancel the selection of the selection area associated with the "stopper" and may accept a selection of the selection areas until the player selects the predetermined number "n" of the selection areas. The predetermined counter value may be currency in the game, an item or the like, for example.

This means that even when the player selects the selection area associated with the "stopper", if the player pays the counter value, the enhancement management unit 44 cancels the selection of the "stopper" and accepts the selection of the predetermined number "n" of the selection areas without the selection area associated with the "stopper". Then, the enhancement management unit 44. However, there is a case that the enhancement screen includes a plurality of selection areas each of which is associated with the "stopper". In such a case, even if the selection of one of the selection area associated with the "stopper" is canceled, there is a possibility that the player selects another of the selection areas associated with the "stopper" in the same enhancement screen. If the player selects the other of the selection areas associated with the "stopper", the same processes are performed again.

On the other hand, when the player selects the selection area associated with the "stopper" and does not pay the counter value, the enhancement management unit 44 does not accept the selection of the selection areas thereafter, and varies the parameter value of the game medium in accordance with the parameter data components associated with the selection areas that are already selected by the player.

Further, in this embodiment, in enhancing the game medium, the enhancement management unit 44 accepts a designation of the number of times "M" that determines the number of times that the enhancement screen is to be displayed, from the terminal device 1 of the player. Then, the enhancement management unit 44 controls the enhancement screen display processing unit 46 to display the enhancement screen for "M" times. In this case, the enhancement management unit 44 varies the parameter value of the game medium in accordance with the parameter data components associated with the selection areas selected by the player in all the enhancement screens. In other words, in this embodiment, the player can continuously select selection areas from a plurality of enhancement screens, where the maximum number of the enhancement screens is "M", unless the player selects (draws) the selection area associated with the "stopper". Here, the selection areas may be associated with different parameter data components for different enhancement screens.

Here, the number of times "M" for which the enhancement screen is to be displayed may be limited. For example, in the game targeted in this embodiment, the enhancement management unit 44 gives an enhancement right, by which a player can enhance a game medium once, in accordance with the action by the player in the game. The enhancement management unit 44 may give the enhancement right in a form of an item (a rolled book or the like), for example. The enhancement management unit 44 accepts the designation of the number of times "M" for which the enhancement screen is displayed within a range of the number of enhancement rights given to the player. Further, for a case when the player does not have a sufficient number of the enhancement rights, the enhancement management unit 44 may be configured to accept the designation of the number of times "M" if the player pays predetermined currency in the game. The amount of the currency may be determined in accordance with the number of times "M" for which the enhancement screen is to be displayed designated by the player. If the number of times "M" for which the enhancement screen is displayed is increased, the player can select greater number of the selection areas so that the player can enhance the game medium more.

The player information storing unit 66 stores various player information of all of the players who participate in the game. The player information management unit 48 manages updating, referring or the like of the player information stored in the player information storing unit 66.

FIG. 6 is a view illustrating an example of an internal structure of the player information storing unit 66 of the embodiment.

The player information storing unit 66 includes items (fields) such as "player ID", "status", "icon data", "player name", "currency in game", "number of enhancement rights", "possessing game medium" or the like.

The "player ID" is data to specify the player. The "status" indicates the status of the player in a progression of the game. The "icon data" is data to specify a display icon of the player. The "player name" is data for display name of the player. The "currency in game" indicates currency possessed by the player that can be used in the game. The "number of enhancement rights" indicates the number of times that the player can enhance game media.

The "possessing game medium" is data regarding the game medium possessed by the player. The "possessing game medium" includes items (fields) such as "game medium ID", "parameter", "enhancement status" or the like. The "game medium ID" is data to specify the game medium. The "parameter" is data to indicate a parameter of the game medium. For example, the game medium whose game medium ID is "M001" is provided with parameter values such as "ATK: +10, DEF: +5" or the like. These parameter values are given in accordance with the action by the player in the game.

The "enhancement status" is data indicating whether the game medium is already enhanced. Although whether the game medium is already enhanced or not is illustrated here, for example, when it is possible to enhance each of the game media for a plurality of times, the number of times for which the game medium is enhanced may be stored. Further alternatively, if the number of times capable of enhancing the game medium is limited, the remaining number of times capable of enhancing the game medium may be stored.

Figure 7:
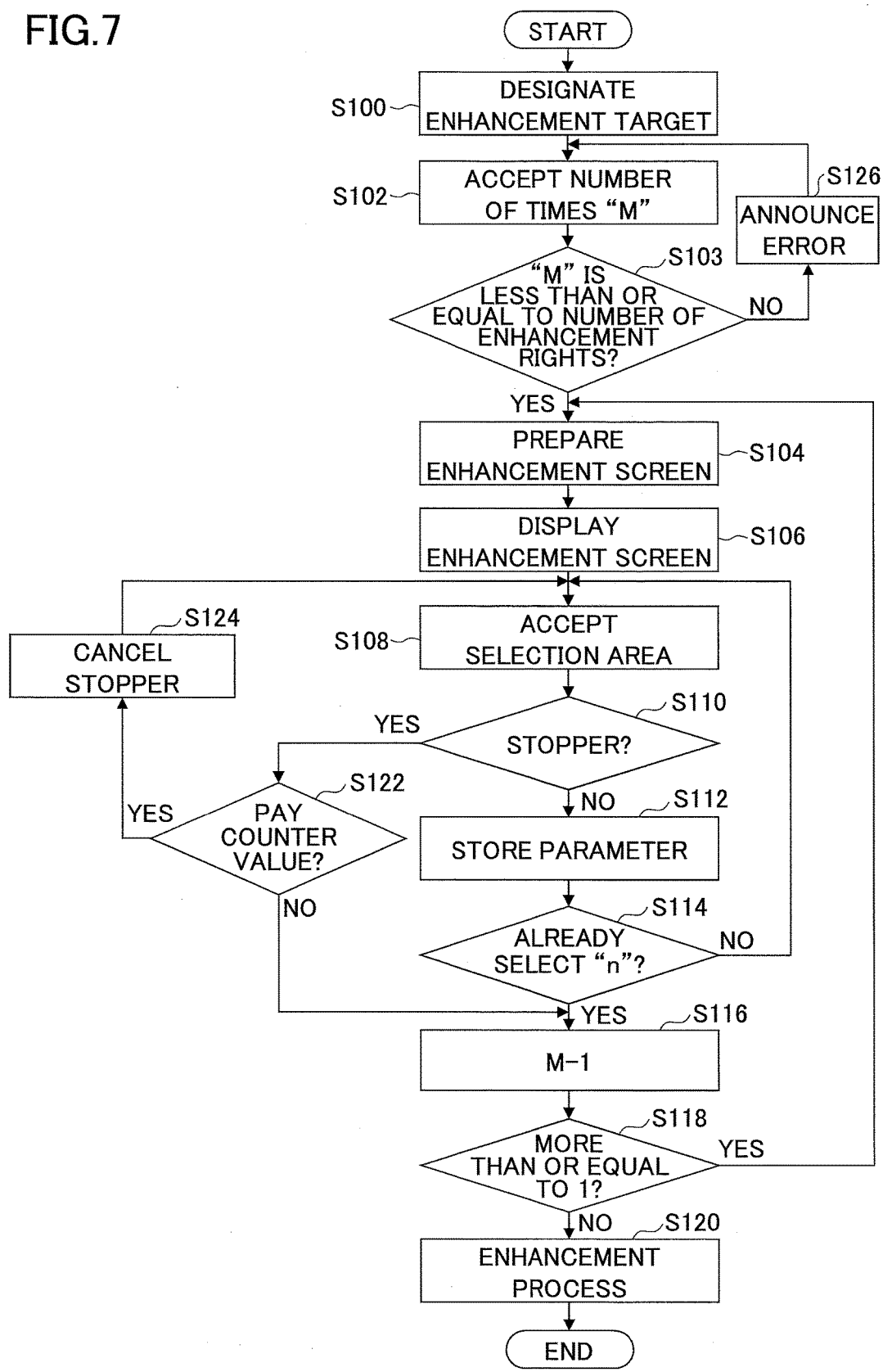
FIG. 7 is a flowchart illustrating an example of processing steps of the game control server apparatus of the embodiment.

FIG. 7 is a flowchart illustrating an example of process steps of the game control server apparatus 4 of the embodiment. FIG. 7 illustrates process steps of the game control server apparatus 4 when the game control server apparatus 4 enhances a game medium in the game in this embodiment.

When an enhancement target game medium is designated (step S100), the enhancement management unit 44 accepts the designation of the number of times "M" for which the enhancement screen is to be displayed from the player (step S102). Here, the enhancement target game medium may be designated by the player or may be designated by the system side and may be presented to the player when a predetermined condition is satisfied or the like.

Next, the enhancement management unit 44 refers to the player information storing unit 66 via the player information management unit 48 and determines whether the number of times "M" accepted in step S102 is less than or equal to the "number of enhancement rights" of the player (step S103). When the number of times "M" is less than or equal to the "number of enhancement rights" of the player (YES in step S103), the enhancement management unit 44 temporarily stores the accepted number of times "M" in the enhancement management information storing unit 62. Further, at this time, the enhancement management unit 44 performs a process of subtracting the number of times "M" from the "number of enhancement rights" of the player information storing unit 66 via the player information management unit 48.

Subsequently, under the control of the enhancement management unit 44, the enhancement screen display processing unit 46 prepares an enhancement screen (step S104), and displays the enhancement screen on the terminal device 1 of the player (step S106). As described above, the enhancement management unit 44 controls to select a parameter data component to be associated with each of the selection areas among the plurality of candidates of the parameter data component associated with the respective game medium. Further, the enhancement management unit 44 controls the ratio at which the "stopper" is to be included, or the like, by referring to the enhancement management information storing unit 62.

Figure 8:
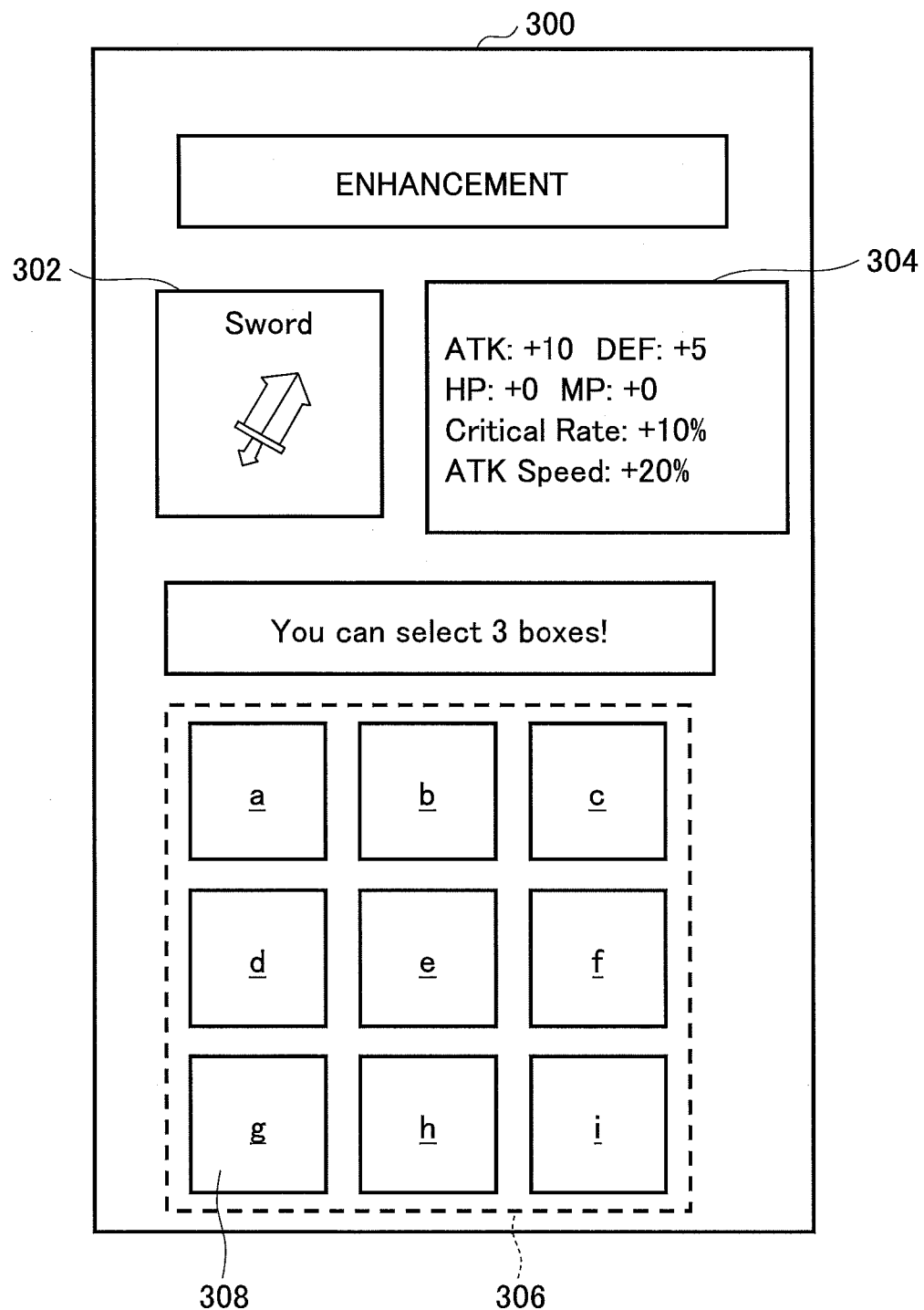
FIG. 8 is a view illustrating an example of an enhancement screen of the embodiment.

FIG. 8 is a view illustrating an example of an enhancement screen 300 displayed on the terminal device 1 of a player.

The enhancement screen 300 includes a game medium display area 302, a parameter display area 304 and a selection part 306. In the game medium display area 302, an image of an enhancement target game medium and its game medium name are displayed. The parameter display area 304 indicates the current parameters of the game medium. The selection part 306 includes the predetermined number "N" of the selection areas 308 (a to i). In this example, the selection part 306 includes 3×3=9 selection areas 308 (a to i). In this embodiment, it is assumed that three of the selection areas 308 can be selected among the 9 selection areas 308 (a to i) of the selection part 306 configured as such. In other words, here, the predetermined number "N"=9 and the predetermined number "n"=3. Further, a part of the selection areas 308 (0 to 2 selection areas, for example) among the selection areas 308 (a to i) is associated with the "stopper".

Here, although reference numerals "a" to "i" are illustrated on the selection areas 308, respectively, for the explanation purpose, actually, a predetermined mark or the like is displayed the selection areas 308, for example, and the player cannot know the parameter data component or the like associated with each of the selection areas 308 until the player selects the selection area 308.

Referring back to FIG. 7, when the player selects one of the selection areas 308, the enhancement management unit 44 accepts the selection (step S108). At this time, under the control of the enhancement management unit 44, the enhancement screen display processing unit 46 displays the parameter data component associated with the selection area 308 on the selection area 308.

Figure 9:
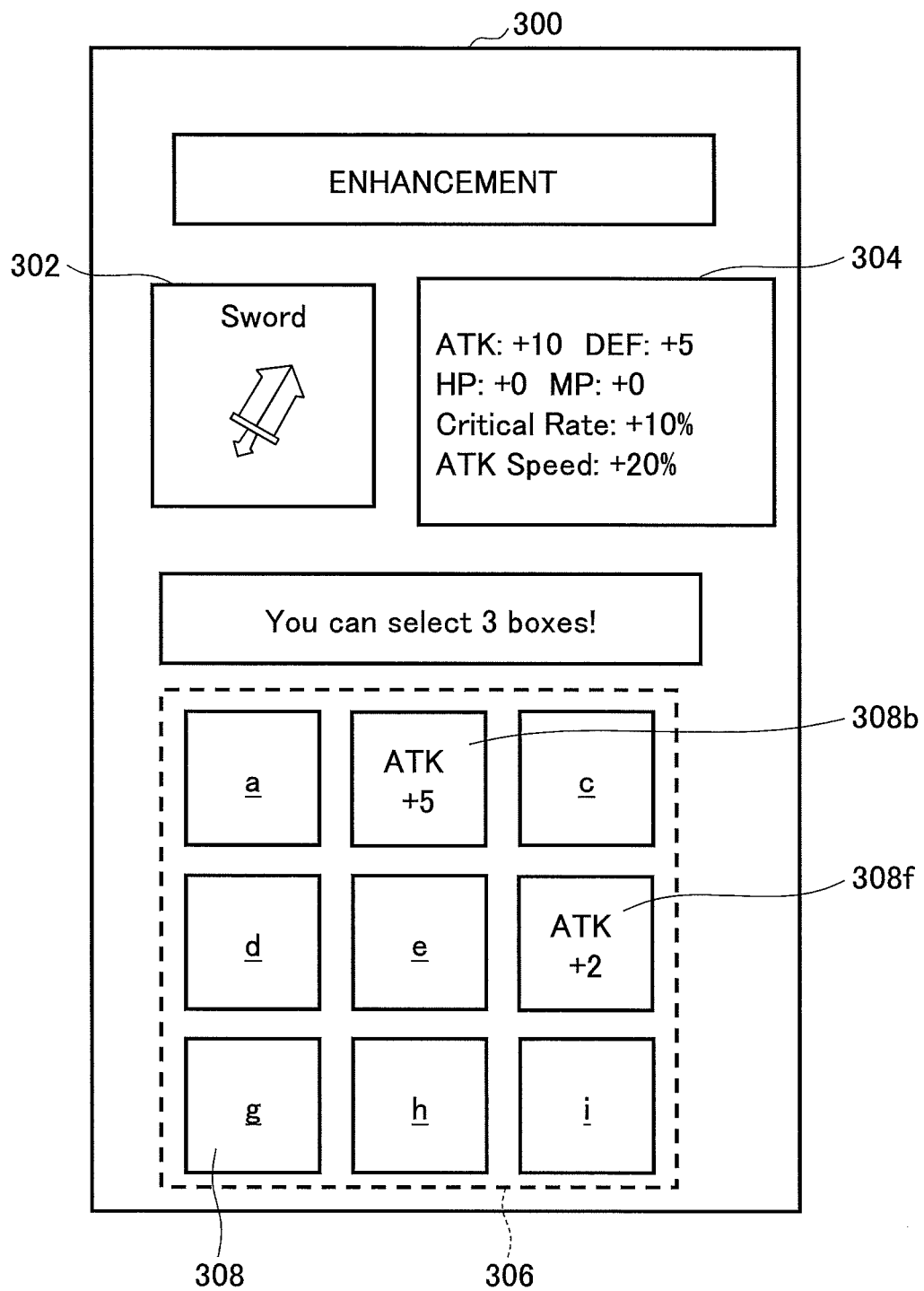
FIG. 9 is a view illustrating an example of an enhancement screen of the embodiment.

FIG. 9 illustrates a status in which the selection area 308b and the selection area 308f are selected among the selection areas 308 illustrated in FIG. 8 and the parameter data component for each of them is displayed. Here, for the selection area 308b and the selection area 308f, parameter data components such as "ATK +5" and "ATK +2" are displayed, respectively.

Referring back to FIG. 7, the enhancement management unit 44 determines whether the selection area 308 selected by the player is associated with the "stopper" (step S110). When the selection area 308 selected by the player is associated with the "stopper" (YES in step S110), the enhancement management unit 44 determines whether the player pays the counter value (step S122).

Figure 10:
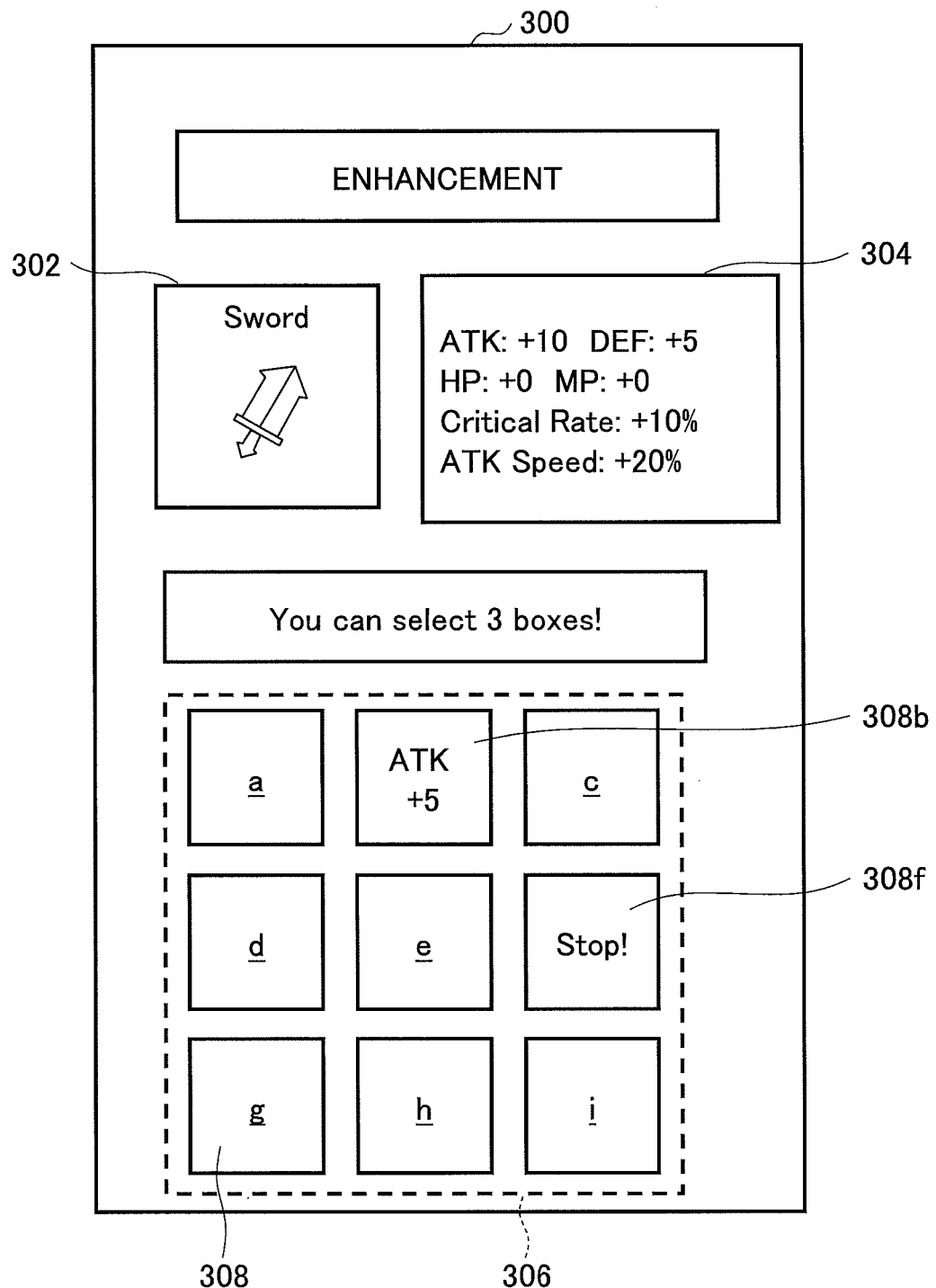
FIG. 10 is a view illustrating an example of an enhancement screen of the embodiment.
Figure 11:
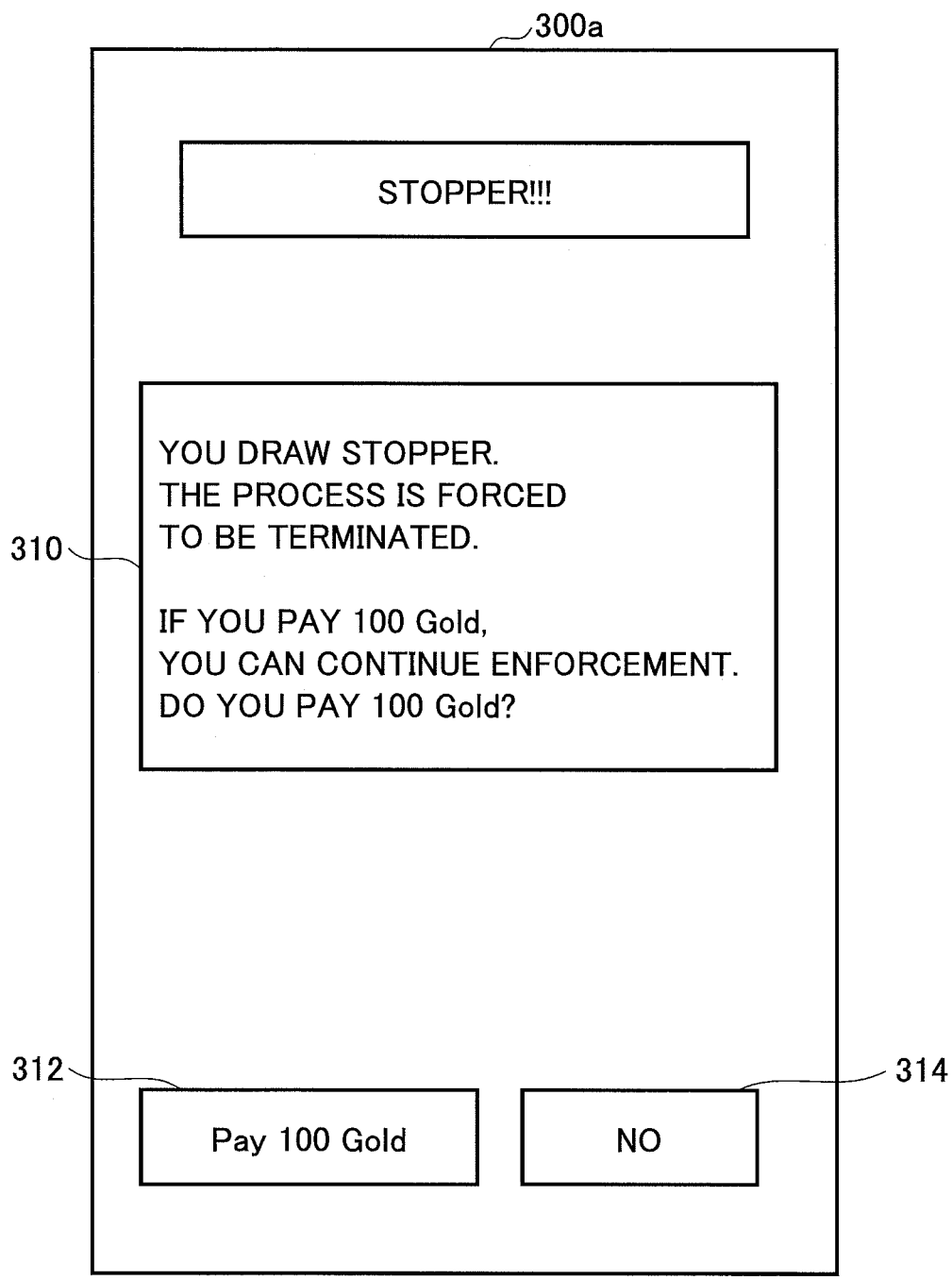
FIG. 11 is a view illustrating an example of an enhancement screen of the embodiment.

FIG. 10 illustrates a status in which the selection area 308b and the selection area 308f are selected in this order among the selection areas 308 illustrated in FIG. 8 and the selection area 308f is associated with the "stopper". FIG. 11 is a view illustrating an example of a screen 300a for inquiring the player whether the player pays the counter value when the selection area 308 selected by the player is associated with the "stopper". The screen 300a includes a message box 310, a counter-value payment button 312 and a "NO" button 314. In the message box 310, facts that the player selected (drew) the "stopper", that the player can continue the enhancement by paying the counter value or the like are displayed.

Referring back to FIG. 7, when the player pays the counter value (YES in step S122, when the counter-value payment button 312 is selected in FIG. 11), the enhancement management unit 44 cancels the selection of the "stopper" (step S124) and returns back to step S108 to accept a selection of a next selection area 308. Further, in step S124, the enhancement management unit 44 performs a process of subtracting the currency in the game corresponding to the payment of the counter value from the currency in the game of the player information of the player.

On the other hand, when the selection area 308 selected by the player is not associated with the "stopper" in step S110 (YES in step S110), the enhancement management unit 44 temporarily stores the parameter data component associated with the selected selection area 308 (step S112). Then, the enhancement management unit 44 determines whether the "n" selection areas are already selected in the current enhancement screen (step S114). When the "n" selection areas are not selected in step S114 (NO in step S114), the process returns back to step S108.

When the "n" selection areas are already selected in step S114 (YES in step S114), the enhancement management unit 44 terminates the selection of the selection areas 308. Then, the enhancement management unit 44 subtracts one (1) from the number of times "M" accepted in step S102 by referring to the enhancement management information storing unit 62 (step S116), and determines whether the remaining number of times is more than or equal to 1 (step S118).

If the remaining number of times is more than or equal to 1 (YES in step S118), returning back to step S104, the enhancement management unit 44 prepares a next enhancement screen 300. On the other hand, when the remaining number of times is less than 1 (zero) in step S118, the enhancement management unit 44 terminates the selection of the selection areas, and performs an enhancement process of enhancing the game medium based on the parameter data components associated with the selection areas that are already selected based on the temporarily stored parameter data components (step S120).

Further, when the player does not pay the counter value in step S122 (NO in step S122, when the "NO" button 314 is selected in FIG. 11), the enhancement management unit 44 terminates the selection of the selection areas 308 in the current enhancement screen and proceeds to step S116.

Here, in step S103, when the number of times "M" is larger than the "number of enhancement rights" of the player (NO in step S103), error is announced or the like (step S126), and then returning back to step S102, the enhancement management unit 44 asks the player to input the number of times "M" again or the like. The process steps for enhancing one of the game media are finished.

This means that, in this embodiment, when one of the following conditions is satisfied, the selection of the selection areas in the respective enhancement screen is finished.
(1) When the selection area selected by the player is associated with the "stopper" and the player does not pay the counter value, or
(2) when the player selects the predetermined number (in this example, three) of the selection areas.

Thereafter, when there is a remaining enhancement screen number, a new enhancement screen is displayed. However, when the remaining enhancement screen number becomes zero, the enhancement process is finished.

Figure 12:
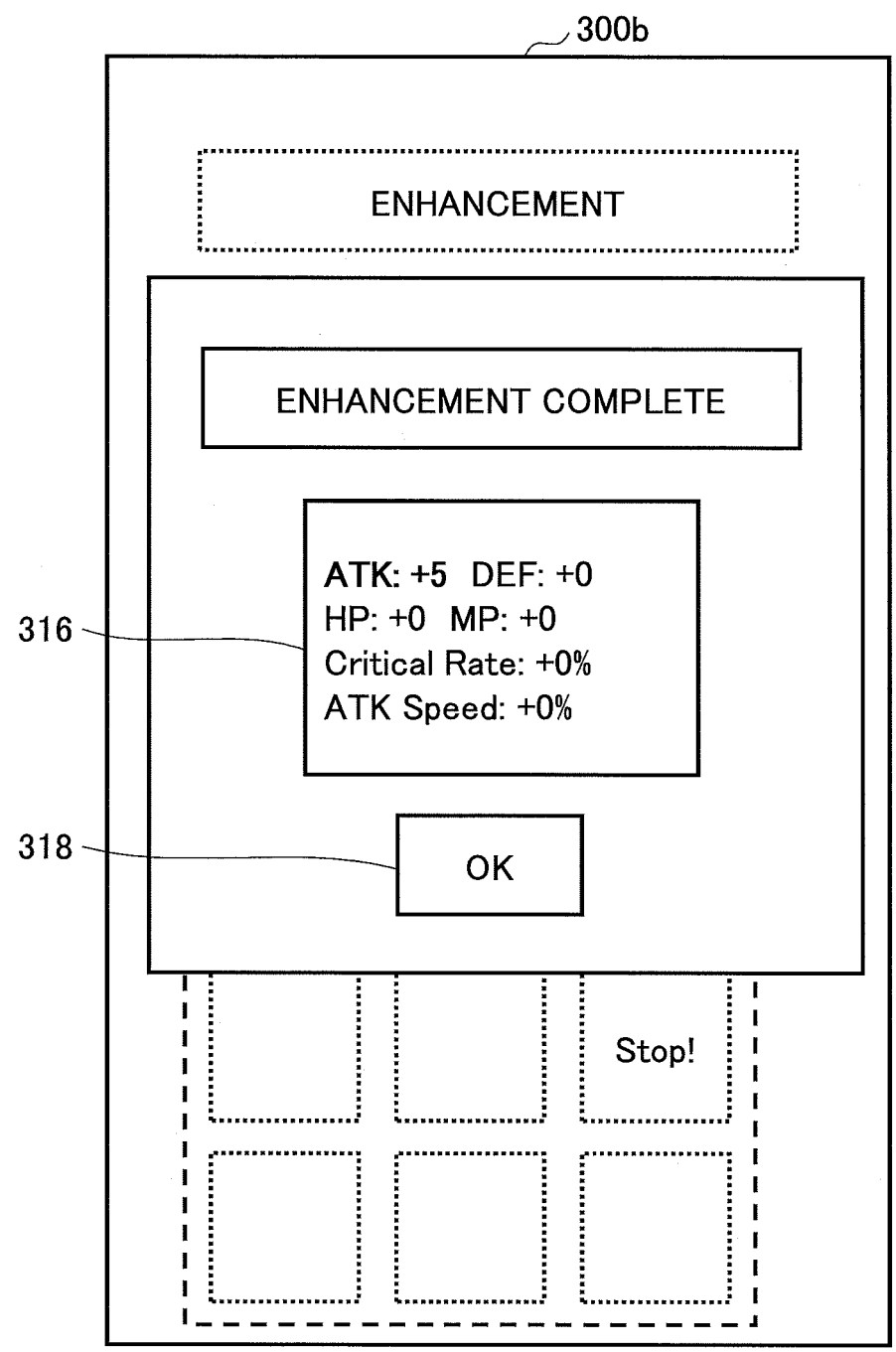
FIG. 12 is a view illustrating an example of an enhancement screen of the embodiment.

Here, a screen for confirming an enhancement result of the game medium may be presented to the player before performing the enhancement process in step S120 or after performing the enhancement process in step S120. FIG. 12 is a view illustrating an example of a screen 300b for confirming the parameter to be varied in enhancing the game medium. The screen 300b includes a variable parameter display area 316 and an "OK" button 318. In the variable parameter display area 316, the kind of parameter, the variation value, a newly obtained special ability or the like that are varied by the enhancement is displayed. When the player selects the "OK" button 318, the kind of parameter, the variation value and the special ability are determined and the enhancement management unit 44 enhances the game medium based on them.

Figure 13:
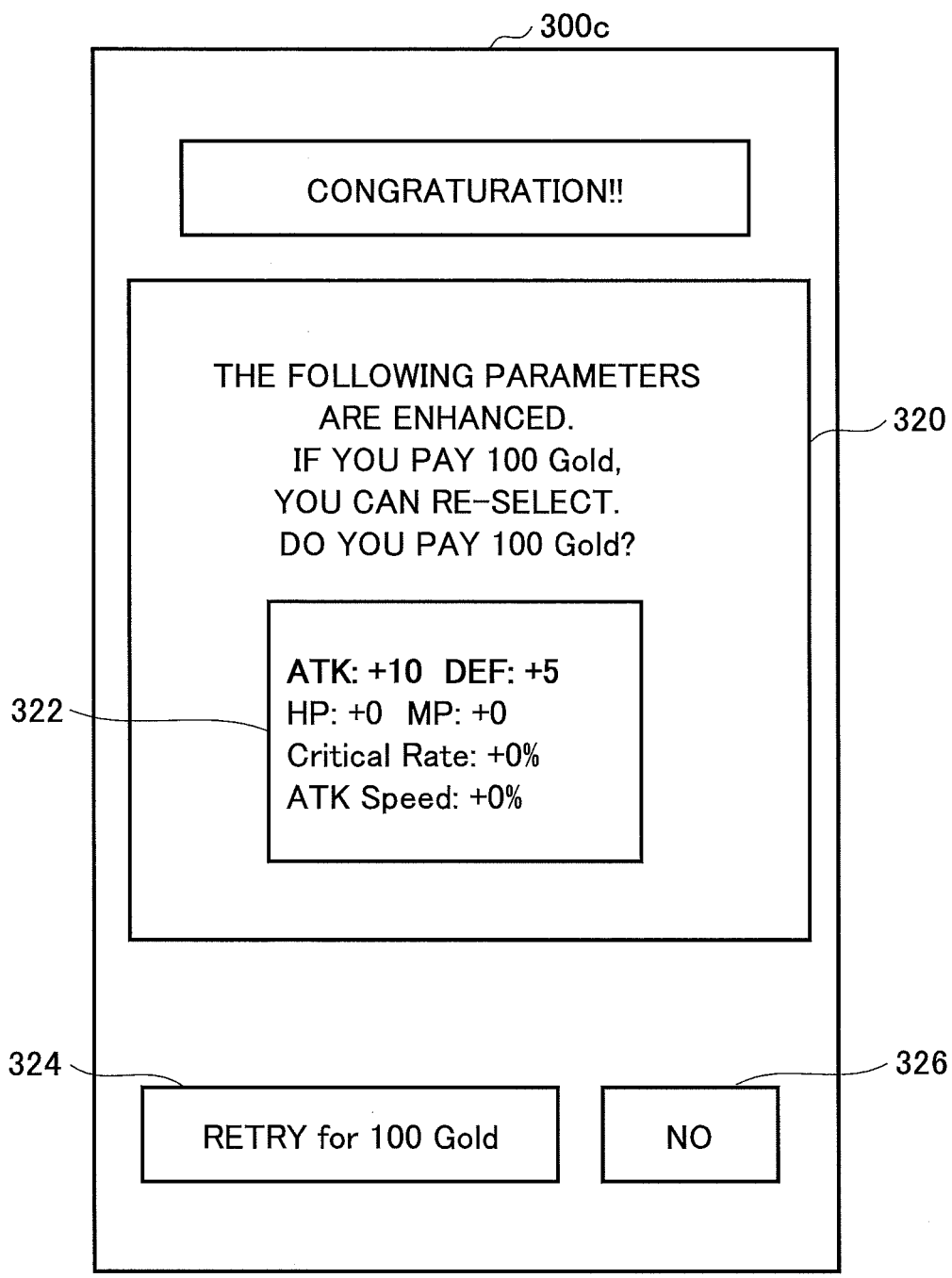
FIG. 13 is a view illustrating an example of an enhancement screen of the embodiment.

Further, the enhancement management unit 44 may cancel all of the selection of the selection areas by the player when the player pays a predetermined counter value so that the player can select new selection areas from the beginning. FIG. 13 illustrates an example of a screen 300c for accepting such re-selection. The screen 300c includes a message box 320, a counter-value payment button 324 and a "NO" button 326. In the message box 320, a variable parameter display area 322 and a message that the player can re-select the selection areas by paying the counter value or the like is displayed. In the message box 320, a kind of parameter and a variation value that are varied by the enhancement, a special ability that can be obtained by the enhancement, or the like is displayed, When the player selects the counter-value payment button 324 and pays the counter value, the result of the enhancement of the game medium is canceled and the process from step S102 in FIG. 7 can be performed again. The number of times that the player can re-try may not be limited, or alternatively, may be limited to a predetermined time. When the player re-tries, the "number of enhancement rights" of the player information storing unit 66 may be return to the original state.

As described above, according to the game control server apparatus 4 of the embodiment, when enhancing a game medium such as equipment or the like, as the player cannot predict which of the parameters varies and the parameter that varies is determined by the selection by the player, the scene for raising the level or the enhancement can be made more exciting.

Further, as the player can continue the enhancement until the player selects the selection area associated with the "stopper", the player can be thrilled when selecting a selection area and the scene for raising the level or the enhancement can be made more exciting.

Further, even when the player selects the "stopper", as the player can continue the selection of the selection area by paying the predetermined counter value, there is an opportunity for the player to participate in when deciding which of the parameters is to be enhanced (alternatively, which of the special abilities is given) and the scene for raising the level of the player character or the enhancing the equipment can be made more interesting.

Further, if the player is not satisfied with the variation result of the parameter, the player can re-select the selection areas. Thus, there is an opportunity for the player to participate in when deciding which of the parameters is to be enhanced (alternatively, which of the special abilities is given) and the scene for raising the level of the player character or the enhancing the equipment can be made more interesting.

Meanwhile, it is necessary for the player to pay the counter value such as currency in the game when the player re-selects. Thus, the game balance can be retained by limiting the re-selection by the player.

According to the embodiment, a technique by which a player can participate in when enhancing a game medium in a game can be provided.

The individual constituents of the terminal device 1 and the game control server apparatus 4 illustrated in FIG. 4 indicate not a structure of hardware units but blocks of functional units. The individual constituents of the terminal device 1 and the game control server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications. Further, the functions performed by the game control server apparatus 4 are not necessarily performed in a single apparatus and may be dispersed in a plurality of apparatuses.

Although a preferred embodiment of the game control server apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, an upper limit of the number of times of displaying the enhancement screen may be set for each of the enhancement target game media. FIG. 14 is a view illustrating another example of the internal structure of the game medium information storing unit 64 of the embodiment.

The game medium information storing unit 64 includes an item (field) of "number of possible enhancements" in addition to the items illustrated in FIG. 5. The "number of possible enhancements" is data indicating an upper limit of the number of times of displaying the enhancement screen for the respective game medium. For example, for the game medium whose game medium ID is "M001", the "number of possible enhancements" is 5, while for the game medium whose game medium ID is "M002", the "number of possible enhancements" is 2. The "number of possible enhancements" for each of the game media may be set in accordance with rare degree or the like of the respective game medium.

In this case, in the process steps explained above with reference to FIG. 7, for example, when the enhancement management unit 44 determines whether the number of times "M" accepted in step S102 is less than or equal to the "number of enhancement rights" of the player in step S103, the enhancement management unit 44 may also determine whether the number of times "M" is less than or equal to the "number of possible enhancements" of the game medium. This means that the enhancement management unit 44 may perform the process of step S104 only when the number of times "M" is less than or equal to the "number of enhancement rights" of the player and also the number of times "M" is less than or equal to the "number of possible enhancements" of the game medium. By setting the number of possible enhancements for each of the game media, the game media can be differentiated in a view of the number of possible enhancements in addition to an initial parameter such as offensive power or the like. Thus, the game media having a wide variety can be provided to the player.

Further, as another example, in step S102 explained with reference to FIG. 7, the enhancement management unit 44 may set the "number of possible enhancements" of the game medium as the number of times "M" at the system side, without accepting the designation of the number of times "M" from the player.

Further, as another example, the processes of step S102, step S103 and step S126 explained with reference to FIG. 7 may not be performed, and the enhancement management unit 44 may set the "number of possible enhancements" of the game medium as the number of times "M" at the system side, and may display the enhancement screen for the number of times corresponding to the "number of possible enhancements" set for the respective game medium, regardless of the "number of enhancement rights" of the player.

Further, the "number of possible enhancements" that is an upper limit of the number of times of displaying the enhancement screen may be varied in accordance with the parameter value of each of the game media. As described above, for example, when the player who possesses the game medium performs an action to the game medium in the game, the parameter value of the game medium can be increased. Thus, even for the same game medium, a greater "number of possible enhancements" may be set for the game medium with the higher parameter value, or the like.

FIG. 15 is a view illustrating another example of the internal structure of the game medium information storing unit 64 of the embodiment. Similar to the structure illustrated in FIG. 14, the game medium information storing unit 64 has the item (field) of the "number of possible enhancements". The "number of possible enhancements" includes items such as "parameter range" and "number of times". For example, for the game medium whose game medium ID is "M001", when "ATK" of the game medium is more than or equal to "+10", the "number of times" is set as 5, and when "ATK" of the game medium is less than "+10", the "number of times" is set as 2. As such, the game medium information storing unit 64 may have a structure in which a plurality of combinations of the range of the parameter value of the game medium and the "number of possible enhancements" at the range are included for each of the game media.

In this case, in the process steps explained with reference to FIG. 7, for example, the enhancement management unit 44 may also determine whether the number of times "M" accepted in step S102 is less than or equal to the "number of possible enhancements" associated with the range in which the parameter value of the game medium is included, in step S103. This means that the enhancement management unit 44 may perform the process of step S104 only when the number of times "M" is less than or equal to the "number of enhancement rights" of the player and also the number of times "M" is less than or equal to the "number of possible enhancements" corresponding to the parameter value of the game medium of the player.

Further, as another example, in step S102 explained with reference to FIG. 7, the enhancement management unit 44 may perform the process of step S104 when the number of times "M" is less than or equal to the "number of possible enhancements" corresponding to the parameter value of the game medium of the player regardless of the "number of enhancement rights" of the player, without determining whether the number of times "M" is less than or equal to the "number of enhancement rights" of the player.

Further, each of the game media may be enhanced at timing when the parameter value of the game medium becomes more than or equal to a predetermined value, or the like. The game medium information storing unit 64 may store, for each of the game media, a parameter value at which an enhancement process can be performed on the game medium. In this case, the enhancement management unit 44 may present a fact that the enhancement of the game medium can be performed at timing when the parameter value of the game medium possessed by the player becomes the parameter value at which the enhancement process can be performed for the game medium stored in the game medium information storing unit 64 by referring to the player information storing unit 66.

Further, in the above embodiment, when the player selects the selection area associated with the "stopper" in an enhancement screen, selection of the selection area in that enhancement screen is terminated. However, alternatively, if the player selects the selection area associated with the "stopper", it may be set that selection of selection areas in the rest of the enhancement screens is terminated. In this case as well, the player can continue the selection of the selection areas by paying a predetermined counter value.

Further, the parameter data component that is associated with each of the plurality of selection areas of the enhancement screen may be determined such that the difference between the parameter values or the like of two or more of the parameter data components is not so large and rational and not minus values. On the other hand, as another example, the parameter value may be a minus value, as the parameter data component.

Further, the game may be performed by any of a "browser type" and an "application type". In the browser type, screen transition data (View data) that describes a display control content of a series of screens in accordance with the game progression is managed at the game control server apparatus 4 side, data such as an HTML data document, images corresponded to the HTML data document or the like are sent to the terminal device in response to a request of obtaining data by an input operation from the terminal device 1, and the data are displayed in the web browser on the terminal device 1. Meanwhile, in the application type, game application software (application program) is previously downloaded to the terminal device 1 from the game control server apparatus 4 or the like, the game application software is executed on the terminal device 1, and screen data is generated to be displayed based on screen transition data included in the game application software that is stored in the terminal device 1 after being downloaded and data obtained from the server by an input operation as a trigger.

What is claimed is:

1. A game control server apparatus that is connected to a terminal device of a player via a network, comprising:
an enhancement screen display processing unit that displays an enhancement screen on the terminal device of the player for enhancing a game medium that appears in a game, and that is provided with a predetermined parameter value, the enhancement screen including a predetermined number "N" ("N" is an integer that is two or more) of selection areas that are independently selectable by the player;
an enhancement management unit that accepts a selection of a predetermined number n (n is an integer, where n<N) of the selection areas among the predetermined number "N" of the selection areas of the enhancement screen, from the terminal device of the player;
a game management control unit that gives a parameter value to the game medium in accordance with an action of the player in the game; and
a game medium information storing unit that stores an upper limit of a number of times capable of displaying the enhancement screen in association with the game medium and a range of the parameter value of the game medium, the higher the parameter value of the game medium is, the larger the upper limit is set for the same game medium;
wherein the predetermined number "N" of the selection areas include a selection area associated with a parameter data component for varying a parameter value of the game medium and there is further a case that the predetermined number "N" of the selection areas include a selection area associated with a stopper for terminating the selection of the selection areas, wherein the enhancement management unit is configured to accept the selection of the selection areas until the number of the selected selection areas becomes a predetermined number "n" among the predetermined number "N" of the selection areas while varying the parameter value of the game medium, when the selection area associated with the parameter data component is selected, in accordance with the parameter data component, performing a termination process by which the selection of the selection areas in the enhancement screen is terminated, when the selection area associated with the stopper is selected, and canceling the selection of the selection area associated with the stopper under a condition that the player pays a predetermined counter value, wherein in enhancing the game medium, the enhancement management unit accepts a designation of the number of times "M" for displaying the enhancement screen from the terminal device of the player, determines whether the designated number of times "M" is less than or equal to the upper limit of the number of times capable of displaying the enhancement screen that is associated with the range of the parameter value in which the predetermined parameter value is included based on the predetermined parameter value of the game medium of the player, and controls the enhancement screen display processing unit to display the enhancement screen for "M" times when the number of times "M" is less than or equal to the upper limit.

2. The game control server apparatus according to claim 1, further comprising:

a player information storing unit that store a number of enhancement rights for which the player is capable of performing the enhancement of the game medium in association with the player, wherein the enhancement management unit determines whether the designated number of times "M" is less than or equal to the number of enhancement rights of the player, and controls the enhancement screen display processing unit to display the enhancement screen for the "M" times when the number of times "M" is less than or equal to the number of enhancement rights.

3. The game control server apparatus according to claim 2, wherein the enhancement management unit gives an enhancement right by which the player is capable of performing an enhancement of a game medium in accordance with an action of the player in the game, and accumulates the enhancement right as the number of enhancement rights in the player information storing unit.

4. The game control server apparatus according to claim 1, wherein the enhancement management unit cancels all of the selection of the selection areas by the player under a condition that a predetermined counter value is paid by the player so that the player is capable of selecting new selection areas again.

5. The game control server apparatus according to claim 1, wherein the enhancement screen includes a selection area associated with a special ability by which a special ability is given to the game medium as the parameter data component, and wherein when the selection area associated with the special ability is selected, the enhancement management unit gives the special ability to the game medium.

6. A non-transitory computer-readable recording medium having recorded thereon a program that causes a computer functioning as a game control server apparatus that is connected to a terminal device of a player via a network, functions as an enhancement screen display processing function that displays an enhancement screen for enhancing a game medium that appears in a game and that is provided with a predetermined parameter value, on the terminal device of the player, the enhancement screen including a predetermined number "N" ("N" is an integer that is two or more) of selection areas that are independently selectable by the player;

an enhancement management function that accepts a selection of a predetermined number n (n is an integer, where n<N) of the selection areas among the predetermined number "N" of the selection areas of the enhancement screen, from the terminal device of the player; and a game management control function that gives a parameter value to the game medium in accordance with an action of the player in the game, wherein the computer includes a game medium information storing unit that stores an upper limit of a number of times capable of displaying the enhancement screen in association with the game medium and a range of the parameter value of the game medium, the higher the parameter value of the game medium is, the larger the upper limit is set for the same game medium, wherein the predetermined number "N" of the selection areas include a selection area associated with a parameter data component for varying a parameter value of the game medium and there is further a case that the predetermined number "N" of the selection areas include a selection area associated with a stopper for terminating the selection of the selection areas, wherein the enhancement management function is configured to accept the selection of the selection areas until the number of the selected selection areas becomes a predetermined number "n" among the predetermined number "N" of the selection areas while varying the parameter value of the game medium, when the selection area associated with the parameter data component is selected, in accordance with the parameter data component, performing a termination process by which the selection of the selection areas in the enhancement screen is terminated, when the selection area associated with the stopper is selected, and canceling the selection of the selection area associated with the stopper under a condition that the player pays a predetermined counter value, wherein in enhancing the game medium, the enhancement management function accepts a designation of the number of times "M" for displaying the enhancement screen from the terminal device of the player, determines whether the designated number of times "M" is less than or equal to the upper limit of the number of times capable of displaying the enhancement screen that is associated with the range of the parameter value in which the predetermined parameter value is included based on the predetermined parameter value of the game medium of the player, and controls the enhancement screen display processing function to display the enhancement screen for "M" times when the number of times "M" is less than or equal to the upper limit.

\* \* \* \* \*